United States Patent
Benim et al.

(10) Patent No.: US 7,745,358 B2
(45) Date of Patent: Jun. 29, 2010

(54) ABRASION-RESISTANT NONWOVEN FABRIC FOR CLEANING PRINTER MACHINES

(75) Inventors: Thomas Edward Benim, Goodlettsville, TN (US); Jaime Marco Vara Salamero, Asturias (ES)

(73) Assignee: E.I. du Pont de Nemours and Company, Wilmington, DE (US)

( * ) Notice: Subject to any disclaimer, the term of this patent is extended or adjusted under 35 U.S.C. 154(b) by 82 days.

(21) Appl. No.: 11/356,537

(22) Filed: Feb. 17, 2006

(65) Prior Publication Data

US 2006/0211323 A1  Sep. 21, 2006

Related U.S. Application Data

(60) Provisional application No. 60/654,201, filed on Feb. 18, 2005.

(51) Int. Cl.
- *B32B 5/06* (2006.01)
- *B32B 5/26* (2006.01)
- *D04H 1/46* (2006.01)
- *D04H 1/54* (2006.01)

(52) U.S. Cl. .................. 442/387; 442/389; 442/402; 442/403; 442/408; 442/409; 442/411; 442/414; 442/415

(58) Field of Classification Search .......... 442/402–409, 442/411, 414, 415, 361, 387, 389
See application file for complete search history.

(56) References Cited

U.S. PATENT DOCUMENTS

| | | | |
|---|---|---|---|
| 2,451,915 A | 10/1948 | Buresh | |
| 2,700,188 A | 1/1955 | Buresh et al. | |
| 2,703,441 A | 3/1955 | Langdon et al. | |
| 2,890,497 A | 6/1959 | Langdon et al. | |
| 3,485,706 A | 12/1969 | Evans | |
| 4,891,262 A | 1/1990 | Nakamae et al. | |
| 5,240,764 A | 8/1993 | Haid et al. | |
| 5,302,446 A * | 4/1994 | Horn | 442/333 |
| 5,368,157 A | 11/1994 | Gasparrini et al. | |
| 5,733,635 A * | 3/1998 | Terakawa et al. | 428/198 |
| 5,974,976 A | 11/1999 | Gasparrini et al. | |
| 6,048,809 A * | 4/2000 | Brow et al. | 442/364 |
| 6,066,388 A * | 5/2000 | Van Kerrebrouck | 428/218 |
| 2002/0002764 A1 * | 1/2002 | Putnam et al. | 28/104 |
| 2002/0116801 A1 | 8/2002 | Oathout et al. | |
| 2002/0187307 A1 | 12/2002 | Tanaka et al. | |
| 2003/0114071 A1 | 6/2003 | Everhart et al. | |
| 2003/0209158 A1 | 11/2003 | Porat | |
| 2005/0085149 A1 * | 4/2005 | Sommer | 442/408 |

FOREIGN PATENT DOCUMENTS

EP  0 696 654 A1  2/1996

* cited by examiner

*Primary Examiner*—Jenna-Leigh Johnson

(57) ABSTRACT

A nonwoven fabric having abrasion resistance and absorbency suitable for cleaning printer cylinders, especially textured or rough printer cylinders, is formed by hydroentangling a fibrous nonwoven web formed from higher-melting polyester base fibers and lower-melting binder fibers, and then thermally bonding the fabric.

4 Claims, No Drawings

ABRASION-RESISTANT NONWOVEN FABRIC FOR CLEANING PRINTER MACHINES

BACKGROUND OF THE INVENTION

1. Field of the Invention

The present invention relates to nonwoven fabrics for cleaning cylinders of machinery, such as printing machine cylinders, especially cylinders having a textured or rough surface.

2. Description of the Related Art

It is known in the art to use nonwoven fabrics to clean the cylinders of printing machines. U.S. Pat. No. 5,974,976 to Gasparrini et al. describes nonwoven cleaning fabrics having reduced air content and the use of such fabrics to clean the cylinders of a printing press. U.S. Patent Application Publication No. 2002/0187307 to Tanaka et al. describes wet-laid sheets for cleaning printer cylinders. The wet-laid sheets contain between about 5 and 50 weight percent binder fibers and are hydroentangled and creped, followed by heating to fuse the binder fibers after creping. Examples of wet-laid sheets include sheets containing at least 60 percent pulp.

In the past, printing machines have generally been configured with three cylinders: plate, blanket, and impression cylinders. The impression cylinder is generally a smooth metal cylinder and holds the paper and presses it against the image-carrying blanket cylinder. More recently, printing machines have been designed to allow the printer to print on the second side of an already printed sheet in a single pass by replacing the smooth-surfaced impression cylinder with a cylinder having a textured (not smooth) or rough surface, which minimizes the contact points with the printed side. The textured or rough impression cylinder is optionally coated, such as with a release coating such as silicone. Uncoated textured or rough cylinders tend to be abrasive. Even the coated rolls can become abrasive as the release coating wears off over time and with use (measured as number of copies printed).

Conventional nonwoven printer cleaning fabrics containing wood-pulp have worked well for cleaning printing machines with smooth-surfaced impression cylinders but have been found to lack the durability desired for cleaning textured impression cylinders and often tear or lint in such applications. It would be desirable to provide an improved cleaning fabric for cleaning textured or rough printing machine cylinders that has high abrasion resistance and low linting while retaining sufficient absorbency to effectively remove inks, solvent, and other solid or paste-like residue from the cylinder surface such as accumulated paper lint fibers.

BRIEF SUMMARY OF THE INVENTION

This invention is directed to a nonwoven fabric for cleaning cylinders comprising a spunlaced nonwoven fabric comprising between about 20 and 50 weight percent of binder fibers comprising a lower-melting component and between about 50 and 80 weight percent of higher-melting polyester base fibers wherein the lower-melting component comprises a polyester copolymer having a lower melting point than the melting point of the higher-melting polyester base fibers, and wherein the spunlaced fabric is thermally bonded by at least partially softening or melting the sheath component of the binder fibers, to provide a thermally bonded spunlaced nonwoven fabric and the nonwoven fabric has a Taber Abrasion value measured on dry fabric of no more than about 2 after 300 revolutions and a Martindale Abrasion value, measured on wet fabric, of no more than about 1.3 after 50 revolutions.

The invention is further directed to a method for using the nonwoven fabric to clean printing cylinders.

DETAILED DESCRIPTION OF THE INVENTION

The terms "nonwoven fabric" and "nonwoven web" as used herein refer to a sheet structure of individual fibers that are positioned in a random manner to form a planar material without an identifiable pattern, as opposed to a knitted or woven fabric.

The term "spunlaced nonwoven fabric" as used herein refers to a nonwoven fabric that is produced by entangling fibers in a fibrous nonwoven web using fluid jets. For example, a spunlaced nonwoven fabric can be prepared by supporting a fibrous web on a porous support such as a mesh screen and hydroentangling the web by passing the supported web underneath water jets, such as in a hydraulic needling process. The fabric can be unpatterned or patterned.

The term "machine direction" is used herein to refer to the direction in which a nonwoven web is produced (e.g. the direction of travel of the supporting surface upon which the fibers are laid down during formation of the nonwoven web). The term "cross direction" refers to the direction generally perpendicular to the machine direction in the plane of the web.

The term "polyester" as used herein is intended to embrace polymers wherein at least 85% of the recurring units are condensation products of dicarboxylic acids and dihydroxy alcohols with linkages created by formation of ester units. This includes aromatic, aliphatic, saturated, and unsaturated di-acids and di-alcohols. A common example of a polyester is poly(ethylene terephthalate) (PET) that is a condensation product of ethylene glycol and terephthalic acid.

The term "binder fiber" is used herein to refer to fibers that are thermally bondable (i.e. meltable or partially meltable) at a temperature below that of the degradation or melting point of higher melting base fibers that are combined with the binder fibers in a nonwoven web. Binder fibers can be homogeneous or can comprise multiple component fibers. The term "multiple component fiber" as used herein refers to a fiber that is composed of at least two distinct polymeric components that have been spun together to form a single fiber. The at least two polymeric components are arranged in distinct substantially constantly positioned zones across the cross-section of the multiple component fibers, the zones extending substantially continuously along the length of the fibers. Multiple component fibers that are suitable for use as binder fibers include a lower melting polymeric component on at least a portion of the peripheral surface thereof. The lower melting polymeric component has a melting point that is lower than the melting point of higher melting base fibers in the web. The term "bicomponent fiber" is used herein to refer to a multiple component fiber that is made from two distinct polymer components. In one embodiment, the binder fibers are sheath-core fibers that comprise a first, lower melting, polymeric component forming the sheath and a second, higher melting, polymeric component forming the core.

The term "staple fibers" means natural fibers or cut lengths from filaments. Typically staple fibers have a length of between about 0.25 and 5.0 inches (0.6 and 15.2 cm).

The present invention relates to thermally bonded spunlaced nonwoven fabrics that are suitable for cleaning cylinders in printing machines or other equipment. The nonwoven fabrics that are low-linting and have an improved balance of dry and wet surface abrasion resistance and absorbency properties which are desirable for cleaning rough or textured cylinder surfaces.

Precursor fibrous webs suitable for preparing spunlaced nonwoven fabrics for use in the present invention comprise a blend of between about 20 and 50 weight percent binder fibers that comprise a lower-melting polyester copolymer component and between about 50 and 90 weight percent base fibers that comprise a higher-melting polyester. In one embodiment, the nonwoven fabric comprises between about 20 and 30 weight percent binder fibers and between about 70 and 80 weight percent base fibers. The low-melting polyester copolymer component preferably has a melting point that is at least about 100° C. less than the melting point of the higher-melting polyester base fiber component. The melting point of the lower melting binder component is generally 100-140° C. less than the higher-melting base fiber component. A binder fiber suitable for use in the present invention is a bicomponent fiber comprising a poly(ethylene terephthalate) copolymer sheath and a poly(ethylene terephthalate) core. An example of a suitable poly(ethylene terephthalate) copolymer comprises an isophthalate copolymer of poly(ethylene terephthalate). Base fibers suitable for use in the present invention include poly(ethylene terephthalate) fibers. Increased binder fiber content results in improved dry and wet surface abrasion resistance and reduced linting, but generally increases the cost of the fabric. In one embodiment, the nonwoven fabric can consist essentially of a blend of polyester-based binder and base fibers. Alternately, up to about 10 weight percent of the base fibers can comprise microfibers (fiber denier less than 1 denier) or hydrophilic polyester fibers for their increased absorbency. For example, between about 5 and 10 weight percent of the fibers in the web can comprise microfibers and/or hydrophilic polyester fibers. Examples of hydrophilic polyester fibers include those that are treated with a hydrophilic finish. One example is Hydrofix® hydrophilic polyester fibers, available from Advansa (Germany). Examples of microfibers suitable for use in the present invention include split fibers. Splittable fibers are made by co-spinning two or more distinct polymeric components into multiple component fibers such that the polymeric components form non-interlocking separable segments across the cross-section of the fibers that extend along the length of the fibers. Splittable fiber cross-sections include "chrysanthemum" cross-sections in which alternating polymeric components are petal-shaped and partially overlapped by adjacent segments, side-by-side, segmented pie (wedge-shaped segments), hollow segmented pie, segmented cross, tipped trilobal, and other cross-sections known in the art. Splittable fibers can be incorporated into the fibrous web and split in the hydroentangling step described below.

The nonwoven fabrics of the present invention can be prepared from precursor fibrous webs that are formed using dry-lay techniques, such as one or more carded fibrous layers, one or more air-laid fibrous layers, or a combination thereof. Methods for preparing air-laid webs and carded webs are well known in the art. For example, air-laid webs can be made according to U.S. Pat. No. 3,797,074 to Zafiroglu or by using a Rando Webber manufactured by the Rando Machine Corporation and disclosed in U.S. Pat. Nos. 2,451,915; 2,700, 188; 2,703,441; and 2,890,497, the entire contents of which are incorporated herein by reference. Staple fibers having a fiber length between about 30-75 mm and fiber denier between about 1 and 15 are generally preferred for preparing carded nonwoven webs. Staple fibers having a fiber length between about 12.7 mm and 25.4 mm and fiber denier between about 0.9 and 4 are generally preferred for preparing air-laid nonwoven webs. The deniers of the binder and base fibers are preferably closely matched for better processability. The base fibers and binder fibers can be admixed in the web during formation in carding, and the like, or by conventional textile blending techniques followed by carding the blended fibers. Alternately, a blend of fibers may be dispersed in an air stream and collected on a foraminous means in an air-laying process. Alternately, individual webs comprising binder fibers and/or base fibers can be layered followed by hydroentangling the combined layers to form a spunlaced nonwoven fabric that has one side richer in the binder fiber than the other side. For example, a web consisting of binder fibers can be layered with a web consisting of base fibers and then hydroentangled. Alternately, one or more of the layers can comprise a blend of binder and base fibers, wherein one of the outer layers has a higher weight percent of binder fibers than the other outer layer. In another embodiment, a sandwiched 3-layer structure can be formed by laying down webs in the configuration binder fiber web-base fiber web-binder fiber web, wherein the binder fiber webs can consist of binder fibers or a blend of binder and base fibers and the base fiber web can consist of base fibers or a blend of binder and base fibers wherein one or both of the binder fiber layers has a higher weight percent of binder fibers than the base fiber layer. The web can then be hydroentanged to form a spunlaced nonwoven fabric that has one or two binder-fiber rich sides. Fibrous nonwoven webs having a basis weight between about 40 and 120 $g/m^2$, preferably between about 50 and 75 $g/m^2$ are suitable for use in the present invention.

Carded webs generally have fibers oriented substantially in the machine direction whereas the fibers in air-laid webs are substantially randomly oriented. Carded webs can be cross-lapped to improve the balance of machine direction and cross direction properties. It is often preferred that the machine and cross direction properties of a nonwoven fabric be balanced, however in one embodiment of the present invention, the nonwoven fabric is prepared from a carded web in which the fibers are substantially oriented in the machine direction. Without being bound to any theory, it is believed that having a high number of fibers oriented in the machine direction helps to reduce the degree to which the fibers are pulled out of the fabric when the fabric is used to clean textured cylinder surfaces such as rough surfaces of some printer cylinders.

After forming a fibrous web comprising base fibers and binder fibers, the web is hydroentangled. The hydroentangling (or hydraulic needling) process for producing spunlaced nonwoven fabrics is well known in the art. In the hydroentangling process, the fibrous web is positioned on a screen or other type of apertured support and subjected to a series of high-pressure water jets that cause entangling of the fibers to form a spunlaced nonwoven fabric. Conventional hydraulic needling processes are described in U.S. Pat. No. 3,485,706, to Evans and U.S. Pat. No. 4,891,262 to Nakamae et al., the entire contents of which are incorporated herein by reference. The support member can be porous, such as a metal or plastic belt or screen that is woven from round or other shaped strands, monofilaments or yarns, or a perforated plate. The hydroentangled fabric can be apertured or non-apertured, depending on selection of the support member, as is known in the art. During the hydroentangling process, the fibrous web is transported on the support and passed under several water jet manifolds. Jet pressures in the range of about 4 to 135 bars can generally be used. The abrasion resistance and tensile properties of spunlaced nonwoven fabrics can be improved by increasing the hydroentangling pressures, or by using more powerful jet types such as 7/20, 4/80 and 5/60 (7 mil holes, 20 holes/inch, etc.). The hydroentangling process can be conducted in one or more stages. For example, the fabric can be hydroentangled in a first stage on a first needling support using an increasing jet pressure profile followed by a second hydroentanglement stage on a second needling support that can be a continuation of the increasing jet pressure profile of the first stage followed by a series of three to five jets of equal pressures. The support member preferably has an airflow at 100 Pascal of between about 2.0 and 4.0 m/sec. After hydraulic needling, the fabric is dried using methods known in the art.

After the fibrous web has been hydroentangled, the resulting spunlaced nonwoven fabric is thermally bonded. Thermal bonding conditions are selected such that the lower-melting binder fiber component (e.g. sheath for sheath-core binder fibers) softens or melts but the higher-melting base fiber and the core component of the binder fiber do not melt and retain their fibrous structure. The bonding conditions should be selected such that the final fabric has the desired abrasion resistance and linting properties. The spunlaced nonwoven fabric can be wound up and thermally bonded at a later time in a separate process. Alternately, thermal bonding can be conducted in-line immediately after hydroentanglement, such as in a heated air dryer. In such a process, excess water can be removed from the spunlaced nonwoven fabric, such as by a vacuum dewatering system or squeeze rolls, prior to passing the fabric through the dryer. In one embodiment, the spunlaced nonwoven fabric is thermally bonded in a through-air dryer in which a heated gas, generally air, is passed through the fabric. The gas is heated to a temperature sufficient to soften or melt the low-melting component of the binder fibers without softening or melting the base fibers to bond the binder and matrix fibers at their crossover points. Through-air bonding generally results in substantially uniform bonding across the width and through the thickness of the fabric, as opposed to surface bonding only. Through-air bonders generally include a perforated drum, which receives the fabric, and a hood surrounding the perforated drum. The heated gas is directed from the hood, through the spunlaced nonwoven fabric, and into the perforated drum. The residence time in the through-air bonder and the temperature of the heated gas is selected to both dry the fabric, if it is wet, and to provide the desired degree of thermal bonding. One or more through-air dryers can be used in series to achieve the desired degree of bonding. It has been found that when the base fibers are poly(ethylene terephthalate) fibers having a melting point of about 250-260° C. and the binder fibers are sheath/core fibers comprising a sheath of low-melting isophthalate copolymer of poly(ethylene terephthalate) having a melting point of about 100-120° C. and a poly(ethylene terephthalate) core, that a bonding air temperature of about 180° C. (fabric temperature between about 130-150° C.) and a residence time between about 8 and 12 seconds in the dryer provides a fabric having sufficient abrasion resistance when the fabric is thermally bonded in-line immediately after it has been hydroentangled.

The thermally bonded nonwoven fabric can optionally be calendered. Room temperature calendering can be used to reduce the thickness of the fabric. This allows a longer fabric length to be wound on a core to provide a desired roll thickness when used as a printer cleaning fabric, as described in U.S. Pat. No. 5,974,976 to Gasparrini et al., which is hereby incorporated by reference. It has been found that calendering with unheated rolls at about 25° C. and at a nip pressure of 32-300×10$^{-1}$ N/cm is suitable for room temperature calendering. Fabric thicknesses up to about 0.7 mm (measured according to EDANA 30.5-99) are suitable for use in the present invention. Although higher thicknesses can be used, it is not desirable from an economic standpoint and also results in less linear meters of fabric for a given cartridge size. Fabric thicknesses between about 0.20 mm and 0.40 mm are generally preferred for the present invention and calendering may be used in order to achieve these thicknesses. Lower thicknesses are preferred in order to get more linear meters of fabric in a cartridge roll so that the cartridge requires changing less often. Alternately, the fabric can be calendered using one or more heated rolls if additional thermal bonding is desired. However, the calendering conditions should be chosen such that the fabric remains sufficiently absorbent to remove ink residue, solvents, or other materials from the surface of the cylinders that are being cleaned. Calendering temperatures in the range of 90-100° C. are generally suitable, with nip pressures in the range of 150 to 250×10$^{-1}$ N/cm.

The cleaning fabric of the present invention can be employed with conventional printer cylinder cleaning systems. The cleaning fabric is generally wound on a core, such as a hollow cylindrical core, which can be mounted on an unwind position of a printer cylinder cleaning system. A cylinder cleaning system can also include a take-up roll onto which the used portion of the cleaning fabric is wound after it has been used to clean the printer cylinder. Generally a means is provided for positioning the cleaning fabric adjacent a printer cylinder. For example, the cleaning fabric can be placed in contact with a printer cylinder as it is fed past the cylinder.

Generally, a cleaning solvent or solution is applied to the cleaning fabric. The cleaning solution can be applied to the fabric before or after a roll of the cleaning fabric is mounted on the printer cylinder cleaning system. The cleaning fabric can be pre-impregnated with a cleaning solution and packaged for later use, as described in U.S. Pat. No. 5,368,157 to Gasparrini et al. Alternately, the cleaning composition can be applied to the cleaning fabric after mounting on a printer cleaning system such as by using pumps, spray bars, manifold lines, etc. known in the art. The cleaning composition can also be applied with a manual sprayer or other suitable apparatus.

The cleaning fabric is used to remove ink residues, cleaning solvent, lint, and other solid or paste-like matter from the printer cylinders. Generally, a pressure pad presses the cleaning fabric into contact with the cylinder during the cleaning process. In addition to abrasion resistance, the cleaning fabric must have sufficient absorbency to absorb residual solvent, etc. as it is removed from the cylinder surface while under pressure. Cleaning fabrics of the present invention that do not contain wood pulp have surprisingly been found to perform well in the cleaning of printer cylinders despite having lower absorbency than conventional cleaning cloths such as spunlaced wood pulp/polyester fabrics.

In order to be suitable for cleaning rough or textured printing machine cylinder surfaces, the thermally bonded spunlaced nonwoven fabric has a Taber Abrasion value (measured on dry fabric) of no more than 4 after 300 revolutions, and preferably has a Taber Abrasion value of no more than about 2 after 300 revolutions, and a Martindale Abrasion value, measured on wet fabric, of no more than about 1.5 after 300 cycles, preferably no more than 1.3 after 50 revolutions, where the Taber and Martindale Abrasion values are measured according to the test methods described below. Preferred fabrics also demonstrate a high ratio of lubed (wet with surfactant) breaking strength to dry breaking strength as well as high stiffness dry and wet, which indicates less distortion of the fabric under load, when wet with the cleaning solvent. Less distortion leads to less tendency to dislodge the fibers of the fabric. The fabric will experience a fiber linting value of no greater than about 100,000 fibers per square meter.

The cleaning fabrics of the present invention can also be used to clean cylinders in other types of apparatus where a balance of abrasion resistance and absorbency is required. For example, the cleaning fabrics of the present invention can be used to clean cylinders in other textile and nonwoven applications including, but not limited to, calenders, textile padding equipment, textile and nonwoven finishing equipment.

Test Methods

In the non-limiting examples that follow, the following test methods were employed to determine various reported characteristics and properties. ASTM refers to the American Society of Testing Materials. ISO refers to the International Standards Organization. EDANA refers to the European Disposables and Nonwovens Association for Europe, Middle East and Africa. IEST refers to the Institute for Environmental Sciences and Technology.

Basis Weight is a measure of the mass per unit area of a fabric or sheet and was determined by EDANA 40.3-90 or ASTM D-3776, which is hereby incorporated by reference, and is reported in $g/m^2$ (gsm).

Thickness of nonwoven fabrics was measured according to EDANA 30.5-99 or ASTM D1777 and is reported in mm.

Tensile Properties (Grab Breaking Strength and Grab Modulus) were measured on dry and lubed samples, according to ASTM D5034-95 that is hereby incorporated by reference.

Breaking Strength is reported in units of kg.

Modulus was measured for dry and lubed fabrics and is reported herein in units of kN/m. Lubed specimens are prepared by immersing in a 0.1% solution of Dupanol ME for 30 seconds. The specimen is then placed on a coarse screen to drain for 30 sec and then placed on a clean dry paper towel for 60 sec. The lubed specimens were not hand blotted. Lubed specimens are tested within 2 minutes after removal from the solution.

Taber Abrasion is a measure of the resistance of a fabric to abrasion when subjected to rotary rubbing action under controlled conditions of pressure and abrasive action, and was measured according to ASTM Test Method D 3884-80, which is hereby incorporated by reference, using a Taber Abraser Model 503 from Teledyne Taber, North Tonawanda, N.Y. The Tester had rubber-base type Calibrade CS-O wheels with 250 g load per wheel. Taber Abrasion values were measured on dry fabrics and the Taber value is reported on a scale of 1 to 15, where 1 is best and 15 is worst. Fabrics were subjected to abrasion testing and evaluated after 50, 100, 150, 200, 250, and 300 revolutions. Two measurements were made for each Example for each cycle of revolutions. The first measurement was made on one side of a first fabric sample and the second measurement was made on the opposite side of a second fabric sample and the two measurements averaged. For each cycle of revolutions a new sample was used.

Weight Loss Taber is a measure of the amount of material removed from the surface of a substrate by subjecting the substrate to a rotary rubbing action. The weight loss was measured on 10.2 cm diameter fabric samples that were conditioned for 24 hours at 70+/−2° F. (21.1+/−1.1° C.) and 50+/−5% relative humidity. A sample was mounted on a Taber Abraser Model 503 from Teledyne Taber, North Tonawanda, N.Y. The tester had H-10 Calibrade wheels on the mounting arm assemblies with a load on each mounting arm of 250 g. The fabric sample was weighed to 0.0001 g and mounted with the side to be tested facing up on the rotary platform and subjected to 50 cycles, followed by re-weighing the sample. Weight loss is reported as the difference between the weight before and after abrasion and reported in units of grams. Measurements were made on two samples and averaged, as described above for Taber abrasion.

Martindale Abrasion is a measure of the resistance of a fabric to abrasion when rubbed against a standard abradant in a continuously changing pattern, and was measured on wet samples according to ASTM D4966, which is hereby incorporated by reference, using a Nu-Martindale Abrasion and Pilling Tester Model 406 with a weight to give 12 kPA pressure and the Lissajous pattern, unless otherwise noted. The standard test method was followed except that the test sample was placed in the fixed holder and the abrader fabric in the movable head, the samples were not conditioned to laboratory humidity and temperature. After abrading, the samples were dried in an oven at 100-110° C. for 5 minutes. Martindale Abrasion was measured on 4-8 samples for each example at a particular number of cycles and the individual results were averaged. Martindale Abrasion is measured on a scale of 1-6, with lower Martindale numbers corresponding to better abrasion resistance (best=1, worst=6). Measurements were made for 50, 100, 150, 200, 250, and 300 revolutions. Martindale values were measured on the polyester side for Comparative Example A and on one side for Examples 1 and 2.

A Biaxial Shake Test was used to measure the number of particles released from a fabric in response to wetting by water and released or generated from the fabric in response to mechanical energy imparted by agitation. The test was performed as generally described in IEST-RP-CC-004.2, which is hereby incorporated by reference, with some simplifications of techniques and calculations. In this test, a fabric sample is placed in a jar and shaken with water. Aliquots of water are removed and assayed for the sum of releasable and generated particles. A Biaxial Shaker, available from W. S. Tyler and an Automatic Particle Counter (PMS Liquilaz Model S05) equipped with PMS Model LS 200 liquid sampler were used. Results are reported as the number of particles/$m^2$.

Linting is a measure of particles released and generated from a fabric. Releasable fibrous debris is determined as follows. Specimens of fabric were cut to approximately 300 by 300 mm. The extrinsic sorptive capacity was measured according to ASTM D6650. A single ply test specimen is placed flat in the center of a plastic tray measuring 300 mm×500 mm×60 mm and 500 ml of distilled water is added to the tray to completely cover the specimen. After the specimen absorbs water to its capacity, the ends of the tray are grasped by hand and alternate ends lifted in a smooth up-and-down motion to gently sluice the water across the specimen surface for 30+/−3 seconds. The water is decanted into a 2-liter beaker and reserved. This sluicing action is repeated two additional times using 500 ml of fresh water each time. The total volume of water is measured to the nearest 50 ml. The suspension is stirred gently with a stirring rod, then aliquotted immediately using a graduated cylinder capable of reading the volume aliquotted to three significant figures. The aliquotted volume is recorded and the aliquotted suspension filtered through a black 47.0 mm diameter, 0.8 micrometer pore size, 3.0-mm grid squares, 100 squares per filtered area membrane filter using a Millipore kit XX71 047-11 or equivalent. The membrane filter is air-dried at room temperature and shielded from dirt, lint, or other air-borne particles. Using a microscope with a calibrated eyepiece reticle, the releasable fibrous debris on each grid of the filter membrane is measured and the number of grids measured to obtain the releasable fibrous debris in particles/$m^2$. Generated fibrous debris is determined as follows. The same sample ply that was tested for releasable fibrous debris is placed into a 4-liter jar. A volume of distilled water is added that is equal to at least twenty times the test specimen's extrinsic sorptive capacity (ml/m$^2$) multiplied by the area (m$^2$) of the test specimen for a total volume of at least 250 ml. A shaker having a frequency near 280 cycles/sec with amplitudes, respectively of 17 and 8 mm, in the major and minor axes of the plane of oscillation, such as a Tyler Model RX-86 or equivalent is used to shake the jar for three minutes. The suspension is swirled gently and aliquotted immediately. Using the filtration apparatus described above, the aliquotted suspension of fibrous debris is filtered through a black membrane filter (described above). The membrane filter is then air-dried at room temperature and the generated fibrous debris counted for each grid of the filter membrane as described above. Linting values are reported as the sum of releasable and generated fibrous debris in particles/m$^2$.

Linting measures fibrous debris over 50 micrometers in length while the Biaxial Shake Test for particles measures non visible particles in the range of 0.5 to 20 micrometers.

EXAMPLES

Example 1

In this example, a blend of polyester bicomponent sheath/core fibers and polyester monocomponent fibers was formed into a spunlaced thermally bonded fabric and evaluated for durability and cleaning effectiveness when used to clean rough-surfaced impression cylinders.

The bicomponent fibers (2.2 dtex, 50 mm length, round cross-section, supplied by TREVIRA GmbH of Bobingen, Germany) comprised a sheath formed from a low-melting isophthalate copolymer of poly(ethylene terephthalate) having a melting point of about 110° C. and a core formed from poly(ethylene terephthalate) having a melting point of about 256° C. The polyester monocomponent fibers (2.2 dtex, 38 mm length, supplied by Wellman, USA) were formed from poly(ethylene terephthalate) and had a melting point of about 256° C. and were blended with the bicomponent fibers to form a fiber blend comprising 25 weight percent of the bicomponent fibers and 75 weight percent of the monocomponent fibers. The blended fibers were processed through two high-speed Thibeau cards, to form a carded web, which was then hydraulically needled according to the general process of Evans U.S. Pat. No. 3,485,706 under the following conditions:

Needling Support 1: Washer belt woven from polyester strands (purchased from Albany International Corporation, Albany, N.Y.)

Needling Support 2: Washer drum woven from polyester strands (purchased from Albany International Corporation, Albany, N.Y.)

Support Speed: 90 m/min

17 Jet Strips, each strip having 40 holes/in (15.7 holes/cm) with a hole diameter of 5 mil (0.13 mm), preceded by a single jet strip angled at an angle of 30 degrees from the perpendicular, as described in Oathout et al. U.S. Patent Application Publication No. US2002/0116801, which is hereby incorporated by reference. The angled jet strip also had 40 holes/in (15.7 holes/cm) with a hole diameter of 5 mil (0.13 mm).

Nine jets with pressures ranged from 4 to 125 bars in an increasing profile comprised for needling support 1. For needling support 2, 8 jets were used and jet pressures ranged from 125 to 135 bars with increasing pressure to reach a plateau before decreasing again. The hydraulically needled sheet was then squeeze rolled with a uniform pressure of 3.0 bars and through-air dried with 2 Fleissner driers at a temperature of 180° C. with a residence time between 5-6 seconds in each dryer. Fabric properties are reported in Table 1 below.

Properties of the thermally bonded spunlaced nonwoven fabrics are reported below in Table 1. All property measurements were made on 8 samples and averaged.

Example 2

In this example, a blend of polyester bicomponent sheath/core fibers and polyester monocomponent fibers was formed into a spunlaced thermally bonded fabric, cold-calendered and evaluated for durability and cleaning effectiveness when used to clean rough-surfaced impression cylinders.

A thermally bonded spunlaced fabric was prepared as described above for Example 1 using a blend containing 26 weight percent of co-poly(ethylene terephthalate)/poly(ethylene terephthalate) binder fibers with a melting point of 100-120° C. and 74 weight percent of poly(ethylene terephthalate) fibers, both (1.62 dtex, 38 mm length) obtained from Advansa (Germany).

The thermally bonded spunlaced fabric was calendered under the following conditions:

Nip Pressure: 90×10$^{-1}$ Newtons/centimeter

Nip Points: 1

Temperature: Room Temperature

Speed: 60 meters/minute

Roll 1: Stainless Steel

Roll 2: Polyamide with hardness 84 shore D.

Properties of the Example 2 calendered fabric are reported below in Table 1. Property measurements were made on 4 test samples and averaged.

Both fabrics of Examples 1 and 2 were found to perform well in cleaning of rough-surfaced or textured printer cylinders. Despite the absence of absorbent fibers, the fabrics performed well to remove ink, solvent, and other residue from the printer cylinder without tearing or significant abrasion of the cleaning fabric.

Comparative Example A

Comparative Example A was a commercially available wood pulp/polyester spunlaced nonwoven fabric that is currently used for cleaning printer machine cylinders, available as Printmaster® Style 8835 from E.I. du Pont de Nemours and Company (Wilmington, Del.). The fabric was found to tear when used to clean rough-surfaced or textured printer cylinders.

TABLE 1

Nonwoven Fabric Properties

| Property | Example 1 | Example 2 | Comp Ex A |
|---|---|---|---|
| Basis weight (g/m$^2$) | 72.9 | 69.5 | 73.9 |
| Thickness (mm) | 0.58 | 0.30 | 0.36 |
| XD Grab Breaking Strength (dry, N) | 93.0 | 82.8 | 111.2 |
| MD Grab Breaking Strength (dry, N) | 183.7 | 217.6 | 190.0 |
| XD Grab Breaking Strength (lubed, N) | 83.7 | 70.8 | 81.9 |
| MD Grab Breaking Strength (lubed, N) | 171.8 | 186.5 | 145.1 |
| XD Grab Stiffness (dry, N/cm) | 48 | 31.5 | 52 |
| MD Grab Stiffness (dry, N/cm) | 174 | 156 | 123 |

TABLE 1-continued

Nonwoven Fabric Properties

| Property | Example 1 | Example 2 | Comp Ex A |
|---|---|---|---|
| XD Grab Stiffness (lubed, N/cm) | 42.7 | 28 | 8 |
| MD Grab Stiffness (lubed, N/cm) | 184 | 80.5 | 43 |
| Weight Loss Taber (dry, g), 50 cycles | .0134 | .0174 | .0290 |
| Taber Abrasion, dry (300 rev) | 1 | 3.5 | 12 |
| Taber Abrasion, dry (700 rev) | 7.5 | 9.5 | Failed (>15) |
| Taber Abrasion, dry (1000 rev) | 7.5 | 10.5 | Failed (>15) |
| Taber Abrasion, wet (50 rev) | 6 | 6.5 | 8.9 |
| Taber Abrasion, wet (100 rev) | 7 | 7.5 | 12.5 |
| Taber Abrasion, wet (300 rev) | 12 | 14 | 14.5 |
| Martindale Abrasion (50) (Wet) | 0.7 | 1.0 | 0.8 |
| Martindale Abrasion (100) (Wet) | 0.8 | 1.0 | 1.3 |
| Martindale Abrasion (150) (Wet) | 0.8 | 1.0 | 1.3 |
| Martindale Abrasion (200) (Wet) | 1.0 | 1.0 | 2.0 |
| Martindale Abrasion (250) (Wet) | 1.0 | 1.0 | 3.1 |
| Martindale Abrasion (300) (Wet) | 1.2 | 1.3 | 3.6 |
| Linting (particles/m$^2$) | $4.5 \times 10^4$ | $9.62 \times 10^4$ | $1.3 \times 10^6$ |
| Biaxial shake (particles/m$^2$) | $5.9 \times 10^6$ | $10.0 \times 10^6$ | $31.37 \times 10^6$ |

The Taber abrasion results for Examples 1 and 2 show an improvement of more than 8 steps of 15 in the dry state and 25 to 50% in the wet state, depending on the number of revolutions, over Comparative Example A. At 700 and 1000 revolutions Comparative Example A has failed completely while examples 1 and 2 both retained structural integrity. The Martindale results for Examples 1 and 2 show the highest improvement, up to 2 steps, with respect to Comparative Example A, in the wet state. This is desirable for the application, since rough textured cylinders are cleaned with solvents in order to remove ink and other residues.

The more objective weight loss Taber indicates that Comparative Example A loses about twice as much as Examples 1 and 2 after 50 revolutions.

Fiber shedding and biaxial shake both measure the amount of visible and sub-visible materials that can be released by a fabric. These tests both indicate an improvement with Examples 1 and 2 over Comparative Example A.

The tensile properties, dry and wet, show the degree to which the binder fibers increase the stiffness of the fabric, lending integrity and strength under moderate stress.

What is claimed is:

1. A nonwoven layered fabric for cleaning cylinders consisting of a spunlaced nonwoven fabric formed by hydroentangling a first fibrous web and an adjacent second fibrous web, wherein the first fibrous web has between about 20 and 50 weight percent of binder fibers comprising a lower-melting component and between about 50 and 80 weight percent of higher-melting polyester base fibers wherein the lower-melting component comprises a polyester copolymer having a lower melting point than the melting point of the higher-melting polyester base fibers, wherein the second fibrous web has no binder fibers and wherein the first fibrous web is thermally bonded by at least partially softening or melting the lower-melting component of the binder fibers to the adjacent second fibrous web, wherein the first fibrous web forms an outer surface of the spunlaced fabric.

2. The nonwoven layered fabric according to claim 1, wherein the binder fibers are bicomponent sheath-core fibers wherein the sheath comprises the lower-melting polyester copolymer component and the core comprises poly(ethylene terephthalate).

3. The nonwoven layered fabric according to claim 1, wherein the thermally bonded spunlaced fabric is calendered after thermal bonding.

4. The nonwoven layered fabric according to claim 3, wherein the calendering is conducted at about 25° C.

* * * * *